United States Patent
Kaeriyama et al.

(10) Patent No.: US 6,553,648 B2
(45) Date of Patent: *Apr. 29, 2003

(54) MANUFACTURING METHOD OF A SIDE CORE TYPE MAGNETIC HEAD SLIDER

(75) Inventors: Naomi Kaeriyama, Shizuoka-ken (JP); Akinobu Sano, Shizuoka-ken (JP)

(73) Assignee: Minebea Co., Ltd., Nagano (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,968

(22) Filed: Nov. 13, 1997

(65) Prior Publication Data

US 2001/0001894 A1 May 31, 2001

(30) Foreign Application Priority Data

Nov. 18, 1996 (JP) ................................ 8-306380

(51) Int. Cl.$^7$ ................................ G11B 5/127
(52) U.S. Cl. ................ 29/603.12; 29/603.16; 29/603.2; 360/234.8; 360/234.9; 156/258
(58) Field of Search .................. 29/603.12, 603.16, 29/603.17, 603.2, 603.21, 412, 414; 360/119, 122, 125, 127, 234.7, 234.8, 234.9, 235; 156/89.12, 258; 451/41; 216/22

(56) References Cited

U.S. PATENT DOCUMENTS

| 3,369,292 | A | * | 2/1968 | Manders ....................... 29/414 |
| 5,305,516 | A | * | 4/1994 | Imazeki et al. ................ 29/603 |
| 5,359,481 | A | * | 10/1994 | Egawa ........................ 360/103 |
| 5,485,332 | A | * | 1/1996 | Egawa et al. ................ 360/103 |
| 5,486,969 | A | * | 1/1996 | Takeya et al. ............... 360/127 |

FOREIGN PATENT DOCUMENTS

JP         8-17007       *   1/1996

\* cited by examiner

Primary Examiner—A. Dexter Tugbang
(74) Attorney, Agent, or Firm—Staas & Halsey LLP

(57) ABSTRACT

A method of manufacturing magnetic head slider including a ferrite core having read/write gap and a housing formed on non-magnetic material having a rail on a surface opposite to a magnetic recording medium. The ferrite core and the housing are bonded to each other. A core bond bar constituted by a continuation at least two cores and a stick-shaped for the housing are bonded to each other ten fine machined. After the fine machining, the bar is cut into individual magnetic head sliders.

3 Claims, 7 Drawing Sheets

FIG.6a
FIG.6b
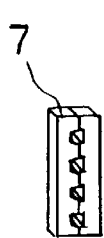
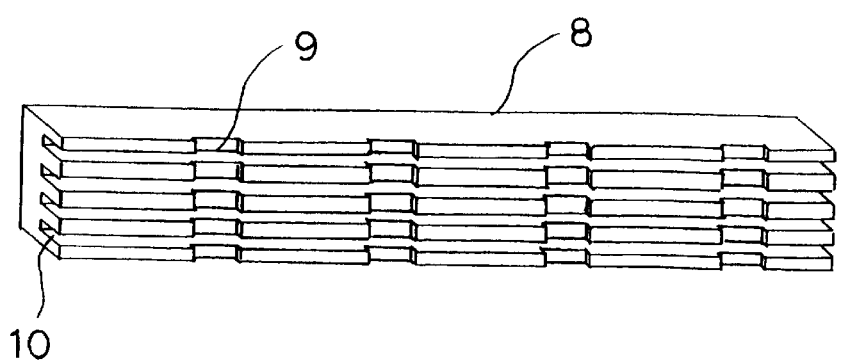
FIG.7
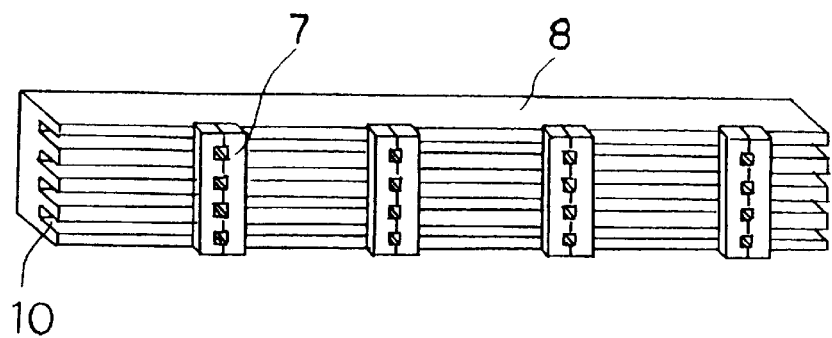

MANUFACTURING METHOD OF A SIDE CORE TYPE MAGNETIC HEAD SLIDER

BACKGROUND OF THE INVENTION

1. Field of the Invention

The present invention relates to a manufacturing method of a side core type magnetic head slider used in manufacturing a magnetic head slider of a magnetic recording apparatus such as hard disk drives and floppy disk drives to be used as auxiliary storage devices for a computer.

2. Description of the Prior Art

In a magnetic head slider used in a magnetic recording apparatus at present, due to improvements in the recording density, since more information content must be recorded per unit volume and in order to improve the data transfer rate and to prevent damage of the head due to contact or collision with a medium, requests for lighter weights and further miniaturization have been intensified. Among these circumstances, a magnetic head used in the field of magnetic recording is broadly classified into two, groups, mainly a thin-film head and a ferrite head. In the ferrite head as shown in FIG. 13a, a slider comprises a housing 230 made of ceramics such as calcium titanate ($CaTiO_3$), zirconia ($ZrO_2$), non-magnetic ferrite or the like, and a ferrite core 130 being a magnetic material, and it is manufactured mainly by the machine work and high-temperature glass bonding.

After the slider 100 is completed, a coil for reading/writing signals via electromagnetic induction is wound to a leg 210 of a core part and is bonded to a predetermined position of a support spring (not shown) having flexibility. As above described, requests for miniaturization of magnetic head sliders are strong. Nanometer size sliders (also called 50% size sliders) shown in FIG. 13(a) are mainly used at present in hard disk drives, where the dimension in the thickness direction of the slider is 0.432 mm, and picometer size sliders (also called 30% size sliders) shown in FIG. 13(b) are expected to increase in usage, as they have a thickness dimension of 0.305 mm and are apt to become even thinner. With this tendency, dimension of the core part becomes small, and a thickness of the core in the nanometer size slider is 0.05~0.100 mm and dimension in a width direction is less than 0.8 mm. Further a magnetic wire of diameter 0.20 mm~0.025 mm is wound in several tens of turns by hand to a leg 210 of the small core part. In the prior art, such fine component parts are subjected to machining work and the processing work is performed by hand in each single part. During the work, reduction in the number of man-hours and improvement of the yield factor have been goals up to this point in time.

Numerals 190 and 200 denote the slope part, numeral 140 denotes a rail and numeral 220 denotes an apex in FIGS. 13(a), 13(b) and 14. In a head manufacturing process, when the head's component parts become small, grasping of parts may fail, or parts may be lost during handling, or there may be a problem of breakage due to lack of strength. Also as shown in FIG. 14, since each of the component parts is treated as a single part of the core or slider, dispersion of the positioning accuracy of respective parts affects the machining accuracy and inhibits the quality stabilization.

In order to eliminate the above-mentioned disadvantages in the prior art, an object of the present invention is to provide a method of manufacturing a side core type magnetic head slider where the yield factor is good and the machining accuracy is high.

SUMMARY OF THE INVENTION

In order to attain the foregoing objects, the present invention provides the following manufacturing method. In a magnetic head slider including a ferrite core having a read/write gap and a housing of non-magnetic material with a rail on a surface opposite to a magnetic recording medium, core bond bars forming a chain of ferrite cores and a housing block are bonded to each other, the core bond bar and a housing plate are bonded to each other and machined into a plurality of slider plates and fine machining is applied thereto, and then the slider plates are separated into a plurality of magnetic head sliders. At the bonding portion between the housing plate and the core, the housing has a groove with a depth equal to a desired track width of the ferrite core, and a width equal to a width of the core bond bar. Also, the housing block is previously provided with a wiring groove at the side surface on which the core bond bar is mounted. After the core bond bar is bonded to the housing block, tapering work is applied at a prescribed angle to the side surface of the surface opposite to the medium, and during the grinding work from the rail surface the angle of the tapering work is adjusted so that when the track width is ground to a predetermined dimension, also a throat height becomes a predetermined dimension simultaneously.

At the beginning of the manufacturing process, component parts are not treated in each single body and the bonding and the machine work are applied to shape the core bond bar and the housing block in a size to tie easily handled. The component parts are separated into individual parts at a step near the end of the process thereby improving the machining accuracy, reducing the number of man-hours required, and improving the yield factor.

BRIEF DESCRIPTION OF THE DRAWINGS

FIG. 6(a) is a diagram showing a core bond bar made by cutting.

FIG. 6(b) is a diagram showing an embodiment where a groove having depth equal to desired track width of the ferrite core and a width equal to a width of the core bond bar is machined in a housing block having prescribed dimension.

FIG. 7 is a diagram showing a state in which the core bond bars shown in FIG. 6(a) are bonded to the housing block shown in FIG. 6(b).

DESCRIPTION OF THE PREFERRED EMBODIMENTS

The first embodiment of the present invention will be described as follows by reference to explanatory views.

Figure 1:
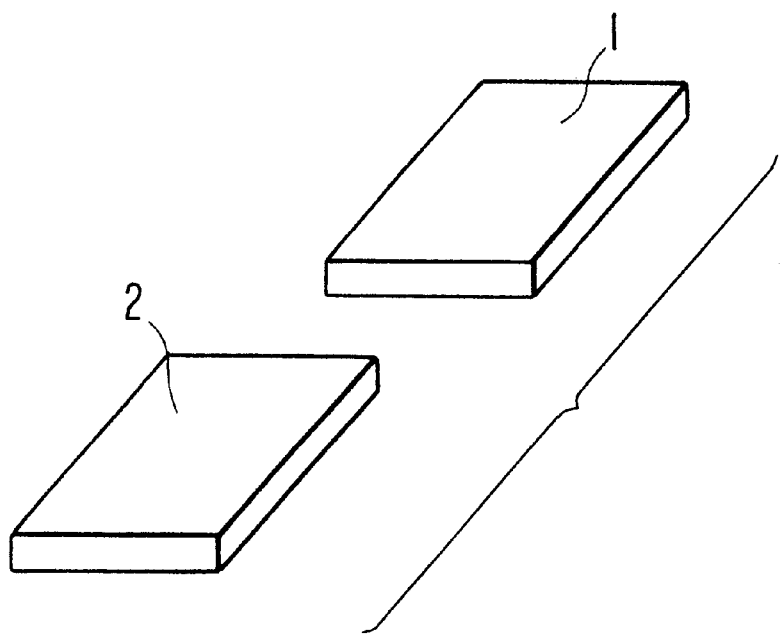
FIG. 1 is a diagram of ferrite substrate for making a ferrite core.
Figure 2:
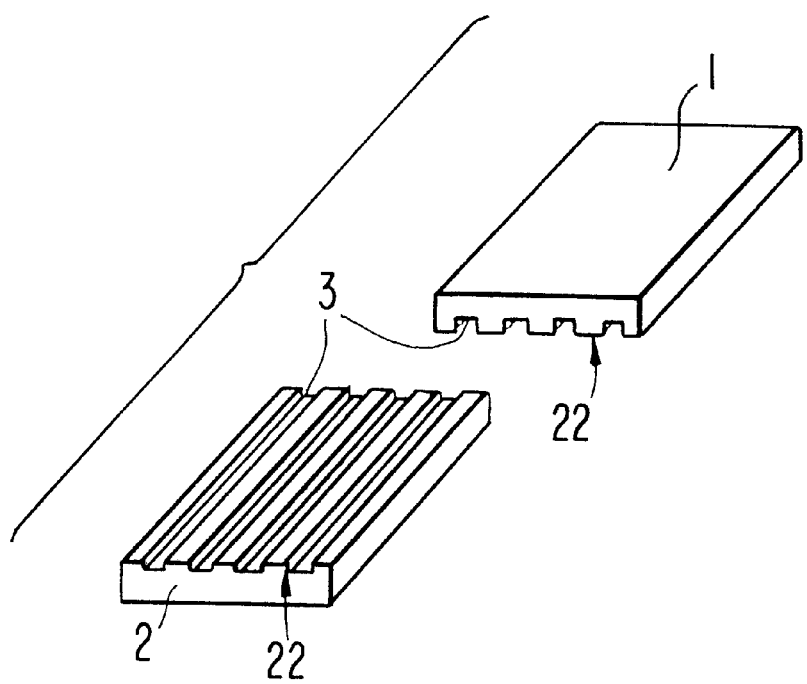
FIG. 2 is a diagram showing a state where grooves for coil wiring are provided on the opposite surfaces of the respective substrates and an apex being datum in depth direction of the read/write gap is formed.

A ferrite core is constituted by two parts, so-called I bar 1 and C bar 2 (also called U° bar), so as to form a read/write gap of sub micron order. FIG. 1 shows the substrate state of the two parts respectively. FIG. 2 is a diagram showing a state that grooves 3 for coil wiring are formed on opposite surfaces of the respective substrates and an apex (FIG. 12: reference numeral 22) being datum in depth direction of the read/write gap is formed.

Figure 3:
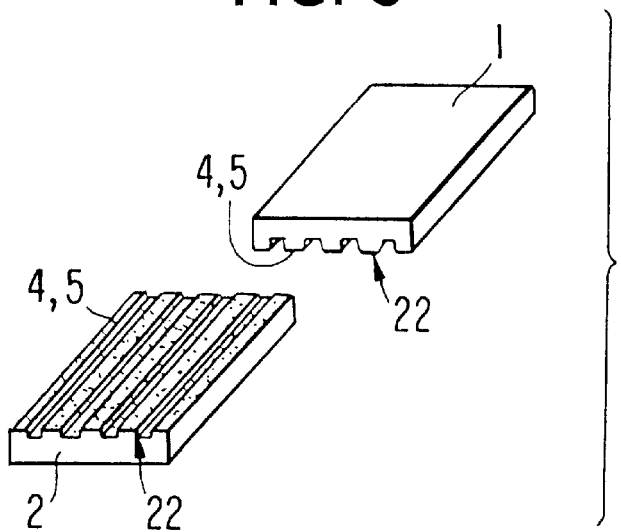
FIG. 3 is a diagram showing the state where a metal film and glass film are spattered to the substrate.
Figure 4:
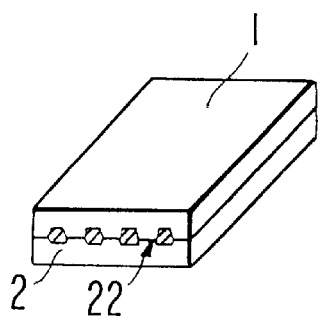
FIG. 4 is a diagram showing the state where the opposite surfaces of the substrates abut each other and are so positioned, and the apex part is filled with glass for reinforcement called secondary glass, and the sputtered glass film and the glass for reinforcement as above described are melted by curing within an electric furnace, and the glass is grasped at the abutting surface between the I bar and the C bar of the ferrite substrate, thereby the gap is formed and the bonding is performed in the state that the gad length of the prescribed length is formed.

The provision of the grooves and the formation of the apex result in that the I bar 1 and the C bar 2 are joined and then machined during grinding work simultaneously on the same jig. Thereby deviations from the pitch distance generated due to abrasion, vibration or the like of the grindstone during grinding can be canceled and the deviation accuracy of glass bond hereinafter described can be improved. After the groove is provided and the user is formed, as shown in FIG. 3, in order to generate a strong magnetic field in the read/write gap, a metal thin-film 4 made of iron and a glass film 5 of non-magnetic material to form the gap length are formed in connection with the other by the sputtering method. Then, as shown in FIG. 4, the opposite surfaces abut on each other and are so positioned. The apex part is filled with glass for reinforcement (not shown) called secondary glass, and the sputtered glass film 5 and the glass for reinforcement as above described are melted by curing within an electric furnace. The glass is grasped at an abutting surface between the I bar and the C bar of the ferrite core thereby the gap is formed and bonding is performed in the state where the gap length of predetermined length is formed.

Figure 5:
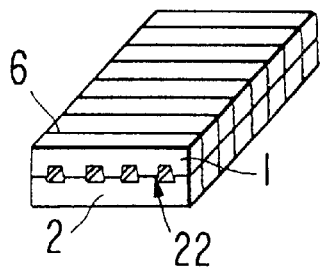
FIG. 5 is a diagram showing directions for cutting on the substrate for forming a core bond bar.

Next, as shown in FIG. 5, the glass-bonded substrate is cut into a block shape, at the position of numeral 6, and machined into bond bars shown in FIG. 6(a) having a thickness desired for the finished ferrite core. In the prior art, cutting is not performed in the direction of the thickness of the ferrite core, instead it is cut in the height direction and after separation from the bond bars, it is then further cut into individual cores. In the present invention, the glass-bonded substrate is cut into a block shape called a core bond bar 7, which makes processing and handling easy.

FIG. 6(b) shows an embodiment where a groove 9 having depth equal to a desired track width of the ferrite core, and a width equal to a width of the core bond bar is machined to a housing block having predetermined dimensions. In order to form the groove, the machine work using a grindstone, ion milling work laser machining, etching machining by chemicals and the like are used. Also, thin film technology may be used to provide an uneven surface, using, for example, sputtering at a high hardness.

Also as shown in the drawing, the housing block is provided at the bonding surface to the core bond bar with a wiring window 10. The wiring window 10 is a groove through which wiring passes when a coil is wound on a lea of a core.

Figure 8:
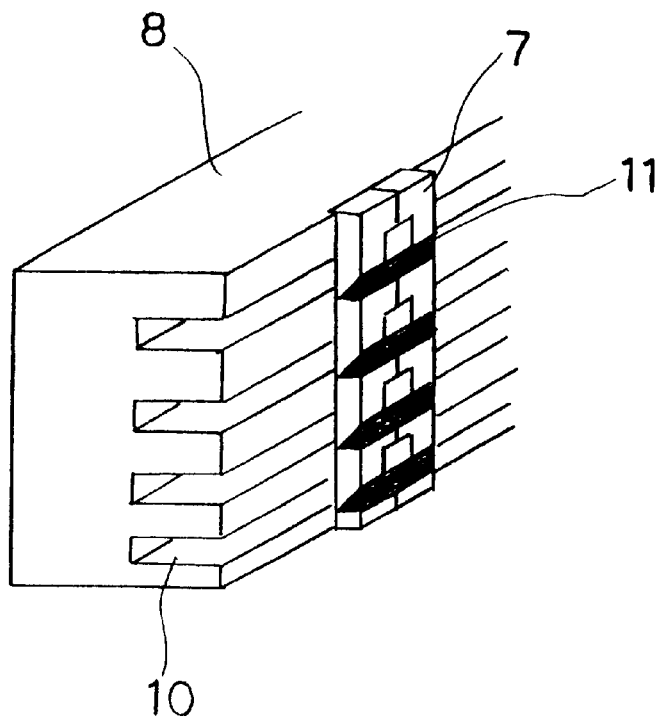
FIG. 8 is a diagram showing state that a taper groove is machined at predetermined position on the outside surface of the bonded core bond bar.

FIG. 7 is a diagram showing how the core bond bar 7 shown in FIG. 6(a) is bonded to the housing 8 shown in FIG. 6(b). A glass having a low melting point is previously sputtered to a thickness of 3000 Å~5000 Å on the bonding surface of the housing block 8a, the core bond bar 7 is set in place, and then the glass is melted and fixed using the glass bond metal. In FIG. 8, a tapered groove 11 is machined at angle of 30 degrees~45 degrees at a predetermined position on the outside surface of the bonded core bond bar 7 during the process of lap machining a rail surface as hereinafter described. Grinding is performed until the track width attains definite dimension. The important machining of the read/write gap is performed, with the throat height also becoming a predetermined dimension.

Figure 9:
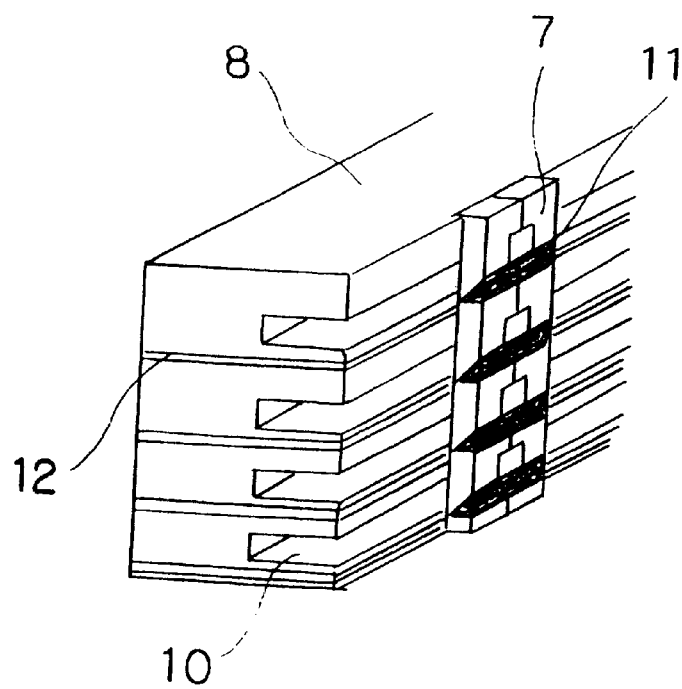
FIG. 9 is a diagram showing a cutting position of the thickness direction of the slider and the housing block.
Figure 10:
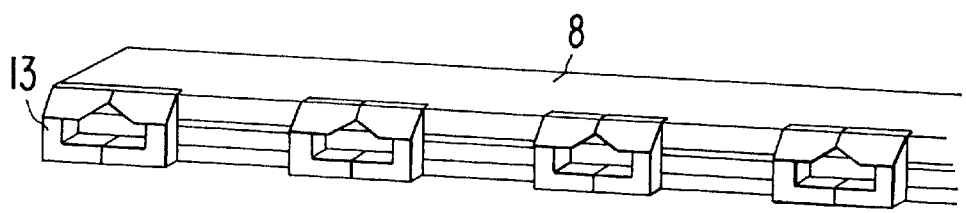
FIG. 10 is a diagram showing a slider plate after being cut.
Figure 11:
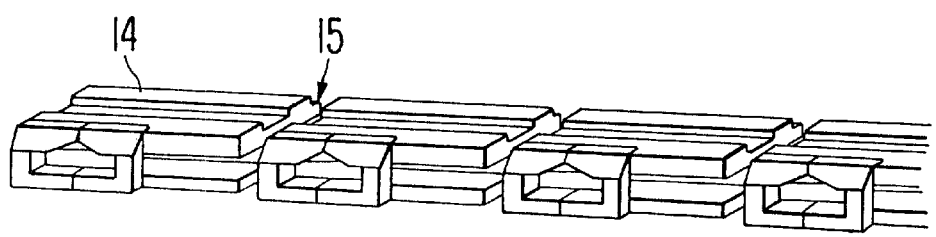
FIG. 11 is a diagram showing a cutting position, thereby making a magnetic head slider.
Figure 12:
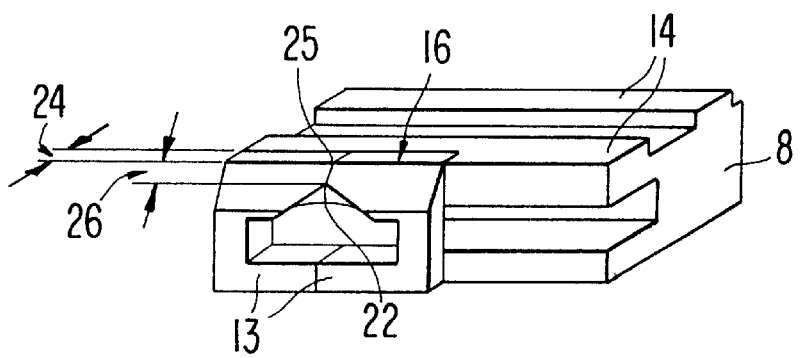
FIG. 12 is a diagram showing a magnetic head slider.
Figure 13A:
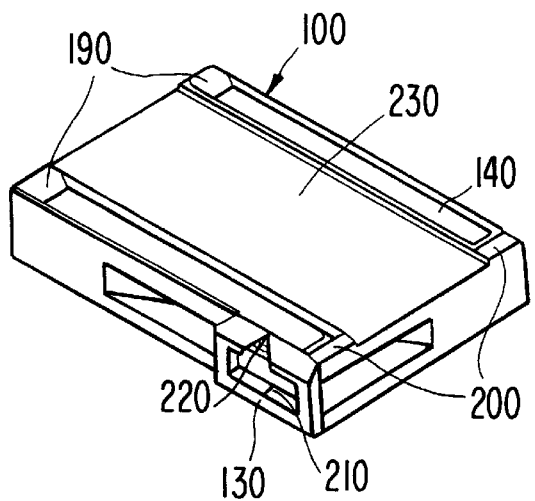
FIGS. 13(a) and 13(b) are diagrams showing a nanometer size slider and a picometer size slider, respectively.
Figure 13B:
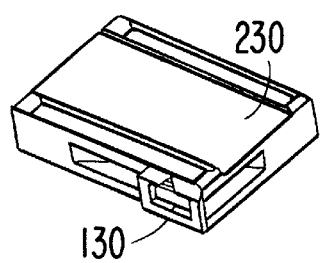
Figure 14:
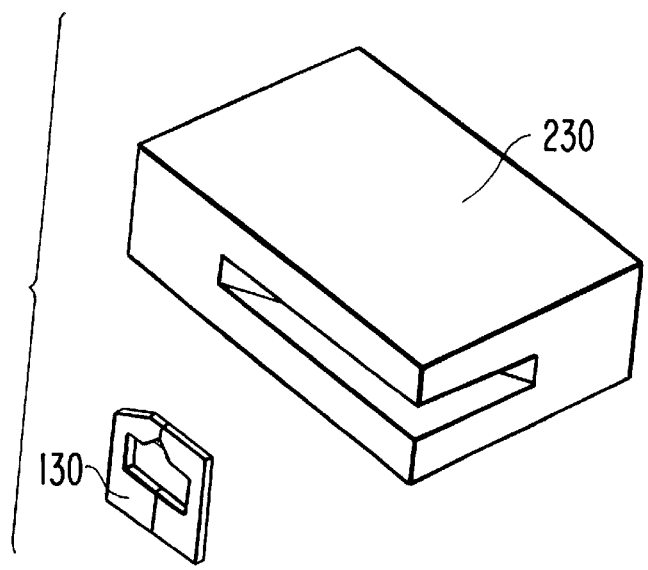
FIG. 14 is a diagram showing a prior art slider.

Next, after the tapered groove is machined, as shown in FIG. 9, cutting work is performed at position 12 so as to cut out the slider in the thickness direction, and a slider plate 16 (FIG. 10) is formed as shown in FIG. 10. As shown in FIG. 11, a rail 14 is machined on the surface of the slider plate in the side of the ferrite core with the tapered groove. The individual slider, as shown in FIG. 12, is formed by cutting through the housing at position 15. The rail surface 14 is machined by grinding so that the track width 24, shown in FIG. 12, and throat height 26, which is a distance from the read/write gap 25 to the apex 22, becomes a definite dimension. At this time, the outside of the core bond bar 7 is scraped at an angle of 30°–45°, the rail surface 16 of the housing is ground. At the grinding process of the rail surface 14, the track width 24 is gradually expanded: As the ground track width 24 is expanded, the throat height 26 will be expanded in proportion to the track width 24. Therefore, an accurate dimension size of the throat height 26 will be obtained when the dimensions of the ground track width 24 is controlled. After an air inlet end 19 and an air outlet end 20 are machined on the surface opposite to the magnetic recording medium, the slider rail surface is chambered to reduce friction with the medium.

This configuration makes handling easy during the machining process, reduces breakage or loss of parts during the work, reduces variations in positioning accuracy, and improves machining accuracy.

In a completed magnetic head slider, a track part formed on a ferrite core bonded to the side surface of a housing being vertical to a rail surface opposite to a magnetic recording medium and parallel to a traveling direction of the medium is arranged so that is does not protrude from the end surface of the housing and is protected from external damage due to handling errors. Also, since the track part is bonded within a groove of the housing, the position accuracy is improved, and work efficiency is improved since the datum for the arrangement is easily understood.

The grooves, through which the wiring passes for winding is to the leg parts of ferrite cores, can be accurately machined in bulk resulting in improved production efficiency. When grinding is performed until track width of the read/write gap of a ferrite core providing on the side surface of the slider attains an arbitrary definite dimension, since the throat height also becomes an arbitrary dimension simultaneously, individual adjustments of these dimensions are not required and the process is simplified. Therefore, the number of man-hours required can be reduced. Also since the simplification of the process results in a decrease in the amount of handling, handling errors are inevitably decreased an the yield factor is improved.

Figure 15:
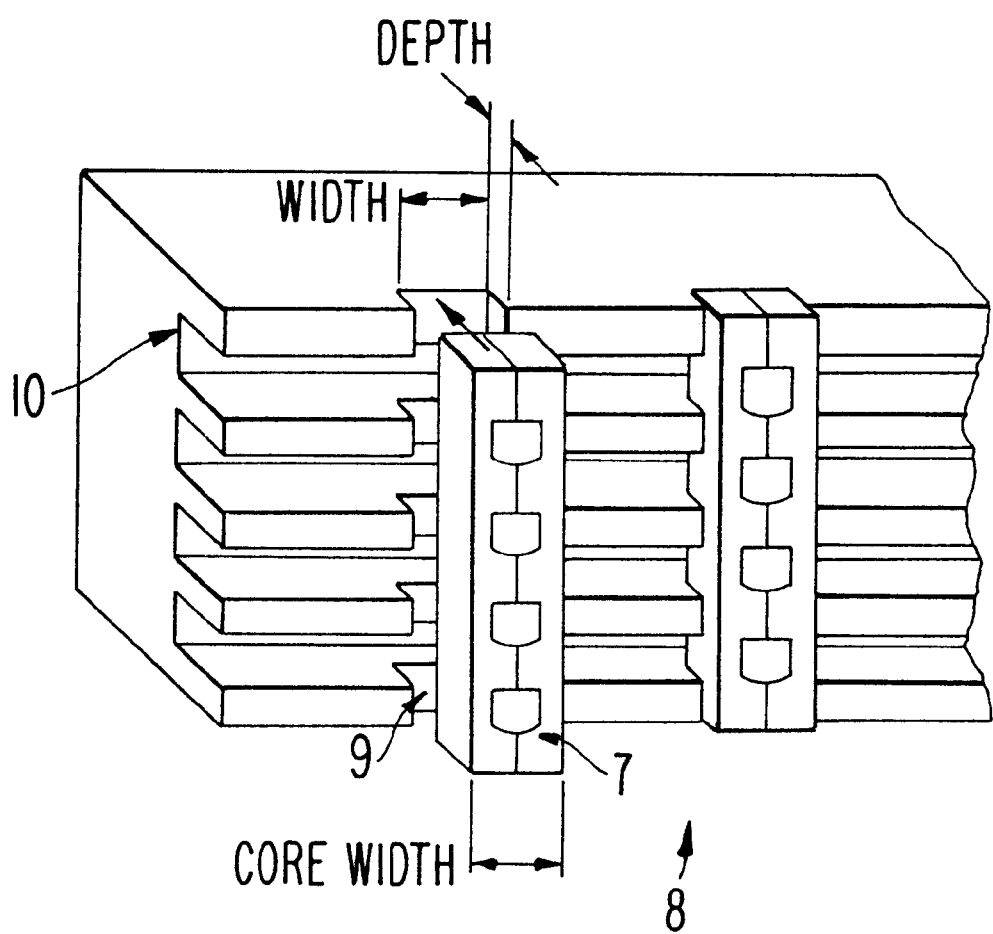
FIG. 15 is a diagram showing the dimensions of the core and groove of the present invention.

FIG. 15 is a diagram showing the depth and width of groove 9 and the width of core 7.

What is claimed is:

1. A method of manufacturing a side core type magnetic head slider including a ferrite core having a read/write gap and a housing formed of a non-magnetic material and having a rail on a surface opposite a magnetic recording medium, the method comprising:

bonding a plurality of core bond bars each forming a chain of portions of the ferrite core to a housing block which has a plurality of winding windows provided on a surface receiving the plurality of core bond bars and oriented along a length direction of the housing block and a plurality of grooves crossing at right angles with respect to the plurality of winding windows, each of the grooves having a depth equal to a desired track width of the ferrite core, each of the grooves having a width equal to a width of each of the core bond bars and each of the grooves adapted to accommodate each of the plurality of core bond bars;

fine machining the housing block with the plurality of core bond bars into a plurality of slider plates; and separating the slider plates into a plurality of magnetic head sliders.

2. A method of manufacturing a side core type magnetic head slider including a ferrite core having a read/write gap and a housing formed of a non-magnetic material and having a rail on a surface opposite to a magnetic recording medium, the method comprising:

bonding a plurality of care bond bars each forming a chain of portions of the ferrite core to a housing block which has a plurality of winding windows provided on a surface receiving the plurality of core bond bars and oriented along a length direction of the housing block and a plurality of grooves crossing at right angles with respect to the plurality of winding windows, each of the grooves having a depth equal to a desired track width of the ferrite cores, each of the grooves having a width equal to a width of each of the core bond bars and each of the grooves adapted to accommodate each of the plurality of core bond bars;

fine machining the housing block with the plurality of core bond bars into a plurality of slider plates, the fine machining including a process of tapering an outside surface of the core bond bar to a predetermined angle at a position where the core bond bar is bonded to the housing block and a process of machining the rail surfaces so as to get a throat height to a predetermined dimension; and separating the slider plates into a plurality of magnetic head sliders.

3. The method as claimed in claim 2, wherein the track width and the throat height are machined simultaneously.

* * * * *